(12) United States Patent
Niitsuma et al.

(10) Patent No.: US 7,731,280 B2
(45) Date of Patent: Jun. 8, 2010

(54) ACTIVE HEADREST MECHANISM FOR VEHICLE SEAT

(75) Inventors: Kenichi Niitsuma, Tochigi-ken (JP); Hirooki Negishi, Tochigi-ken (JP); Jinichi Tanabe, Tochigi-ken (JP); Koji Uno, Saitama-ken (JP); Tatsuya Terauchi, Saitama-ken (JP); Tomoki Matsumoto, Saitama-ken (JP); Koji Sano, Saitama-ken (JP)

(73) Assignees: TS Tech Co., Ltd., Asaka-Shi (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/722,896

(22) PCT Filed: Dec. 21, 2005

(86) PCT No.: PCT/JP2005/023414

§ 371 (c)(1),
(2), (4) Date: May 16, 2008

(87) PCT Pub. No.: WO2006/070650

PCT Pub. Date: Jul. 6, 2006

(65) Prior Publication Data

US 2008/0265637 A1 Oct. 30, 2008

(30) Foreign Application Priority Data

Dec. 27, 2004 (JP) ............................. 2004-375503

(51) Int. Cl.
*B60N 2/427* (2006.01)
*B60R 21/00* (2006.01)

(52) U.S. Cl. ................................................. 297/216.12
(58) Field of Classification Search ............. 297/216.12
See application file for complete search history.

(56) References Cited

U.S. PATENT DOCUMENTS

| | | | | |
|---|---|---|---|---|
| 5,884,968 A * | 3/1999 | Massara | ................. | 297/216.12 |
| 6,199,947 B1 * | 3/2001 | Wiklund | ................ | 297/216.12 |
| 6,250,714 B1 * | 6/2001 | Nakano et al. | ......... | 297/216.12 |
| 6,375,262 B1 * | 4/2002 | Watanabe | ........... | 297/216.12 X |
| 6,568,753 B1 * | 5/2003 | Watanabe | .............. | 297/216.12 |
| 6,604,788 B1 * | 8/2003 | Humer | ................ | 297/216.12 X |
| 6,631,955 B2 * | 10/2003 | Humer et al. | ........ | 297/216.12 X |
| 6,655,733 B2 * | 12/2003 | Humer et al. | .......... | 297/216.12 |
| 6,719,368 B1 * | 4/2004 | Neale | .................. | 297/216.12 X |
| 6,789,846 B2 * | 9/2004 | Humer et al. | ........... | 297/216.12 |
| 6,955,397 B1 * | 10/2005 | Humer | ................... | 297/216.12 |
| 7,044,544 B2 * | 5/2006 | Humer et al. | .......... | 297/216.12 |
| 7,077,472 B2 * | 7/2006 | Steffens, Jr. | ........ | 297/216.12 X |

(Continued)

*Primary Examiner*—Rodney B White
(74) *Attorney, Agent, or Firm*—Browdy and Neimark, PLLC

(57) ABSTRACT

A vehicle seat of the invention includes: a rectangular-shaped seat back frame (5) having a pair of side frames (6); a plurality of seat springs (34A, 34B) disposed between the side frames; a single plate-shaped flexible cushion plate (31) attached to the seat springs; a seat cushion (9) provided on the front side of the cushion plate; link mechanisms (15, 35) provided near the side frames; and a headrest (4) coupled to the link mechanisms (15). Both ends of the seat spring (34B) are coupled to the link mechanisms. When the seat spring (34B) is moved rearward, the headrest is moved forward. Both sides of each of the remaining seat springs (34A) are mounted to the side frames.

5 Claims, 5 Drawing Sheets

U.S. PATENT DOCUMENTS

| | | | |
|---|---|---|---|
| 7,097,242 B2 * | 8/2006 | Farquhar et al. | 297/216.12 |
| 7,104,602 B2 * | 9/2006 | Humer et al. | 297/216.12 |
| 7,237,838 B2 * | 7/2007 | Hoffmeister et al. | 297/216.12 |
| 7,325,869 B2 * | 2/2008 | Braune | 297/216.12 |
| 7,364,231 B2 * | 4/2008 | Park et al. | 297/216.12 |
| 7,393,052 B2 * | 7/2008 | Humer et al. | 297/216.12 |
| 7,401,852 B2 * | 7/2008 | Humer et al. | 297/216.12 X |
| 7,404,606 B2 * | 7/2008 | Kim | 297/216.12 X |
| 7,455,357 B2 * | 11/2008 | Humer et al. | 297/216.12 |
| 7,523,987 B2 * | 4/2009 | Yamaguchi | 297/216.12 |
| 7,540,562 B2 * | 6/2009 | Sekida | 297/216.12 |
| 2003/0001414 A1 * | 1/2003 | Humer et al. | 297/216.12 |
| 2003/0011224 A1 * | 1/2003 | Humer et al. | 297/216.12 |
| 2004/0075312 A1 * | 4/2004 | Neale | 297/216.12 |
| 2004/0119324 A1 * | 6/2004 | Humer et al. | 297/216.12 |
| 2004/0145223 A1 * | 7/2004 | Lee | 297/216.12 |
| 2004/0155496 A1 * | 8/2004 | Farquhar et al. | 297/216.12 |
| 2005/0280296 A1 * | 12/2005 | Ohchi et al. | 297/216.12 |
| 2006/0071517 A1 * | 4/2006 | Humer et al. | 297/216.12 |
| 2006/0202524 A1 * | 9/2006 | Yamaguchi | 297/216.12 |
| 2006/0255632 A1 * | 11/2006 | Sugimoto | 297/216.12 |
| 2008/0001447 A1 * | 1/2008 | Humer et al. | 297/216.12 |
| 2008/0012402 A1 * | 1/2008 | Sekida | 297/216.12 |
| 2008/0079294 A1 * | 4/2008 | Humer et al. | 297/216.12 |
| 2008/0084098 A1 * | 4/2008 | Humer et al. | 297/216.12 |
| 2008/0185882 A1 * | 8/2008 | Humer et al. | 297/216.12 |
| 2009/0001785 A1 * | 1/2009 | Swan et al. | 297/216.12 |
| 2009/0045658 A1 * | 2/2009 | Humer et al. | 297/216.12 |
| 2009/0102255 A1 * | 4/2009 | D'Agostini et al. | 297/216.12 |
| 2009/0167066 A1 * | 7/2009 | Mori et al. | 297/216.12 |

* cited by examiner

ACTIVE HEADREST MECHANISM FOR VEHICLE SEAT

TECHNICAL FIELD

The present invention relates to an active headrest mechanism for a vehicle seat, and more particularly to improvement of a detection mechanism for a rear-end collision in the active headrest mechanism.

BACKGROUND ART

The conventional active headrest mechanism has a collision load detector provided in a seat back and a coupling mechanism for operatively coupling the detector and the headrest (Patent Documents 1 and 2).

When a rear-end collision occurs and a seated person is moved rearward with respect to the seat back, the detector receives a collision load from the vehicle seat occupant and is moved rearward, and the rearward movement of the detector acts on the headrest through the coupling mechanism to move the headrest forward.

[Patent Document 1] Japanese Patent Application Laid-Open No. 2000-211410

[Patent Document 2] Japanese Patent Application Laid-Open No. 10-138814

DISCLOSURE OF THE INVENTION

The conventional detector does not operate in cooperation with a member providing comfort of the seat back (for example, seat spring or seat cushion), but it rather acts to possibly deteriorate the comfort of the seat back. Provision of the detector in the seat back may reduce the thickness of the seat cushion. In other words, if the seat cushion is sufficiently thick, a movable range of the detector is insufficient, so that the operation reliability of the active headrest mechanism is lost.

Since the detector is independent from the member providing comfort of the seat back, the number of parts of the active headrest mechanism is increased, so that the weight of the seat is increased.

Accordingly, an object of the present invention is to provide an active headrest mechanism which is free from the problems stated above.

According to the present invention, the seat cushion is held by a flexible cushion plate mounted on the seat spring. The cushion plate supports the seat cushion on a "plane" in a wide range, so that resilience of the seat spring is substantially uniformly transferred to the seat cushion. The seat cushion supports and disperses the normal load from the seat occupant through the "plane". As a result, the local, unwanted rearward movement of the seat occupant is efficiently prevented and the seat occupant is kept in a stably-seated position.

In the invention, the cushion plate and the seat spring have the function of the collision load detector. When, upon receiving the collision load, the cushion plate and the seat spring move rearward beyond a predetermined range of movement, the movement is transmitted to the headrest via the coupling mechanism. Therefore, the collision load can be reliably detected without impairing the comfort of the seat back.

BEST MODE FOR CARRYING OUT THE INVENTION

Figure 1:
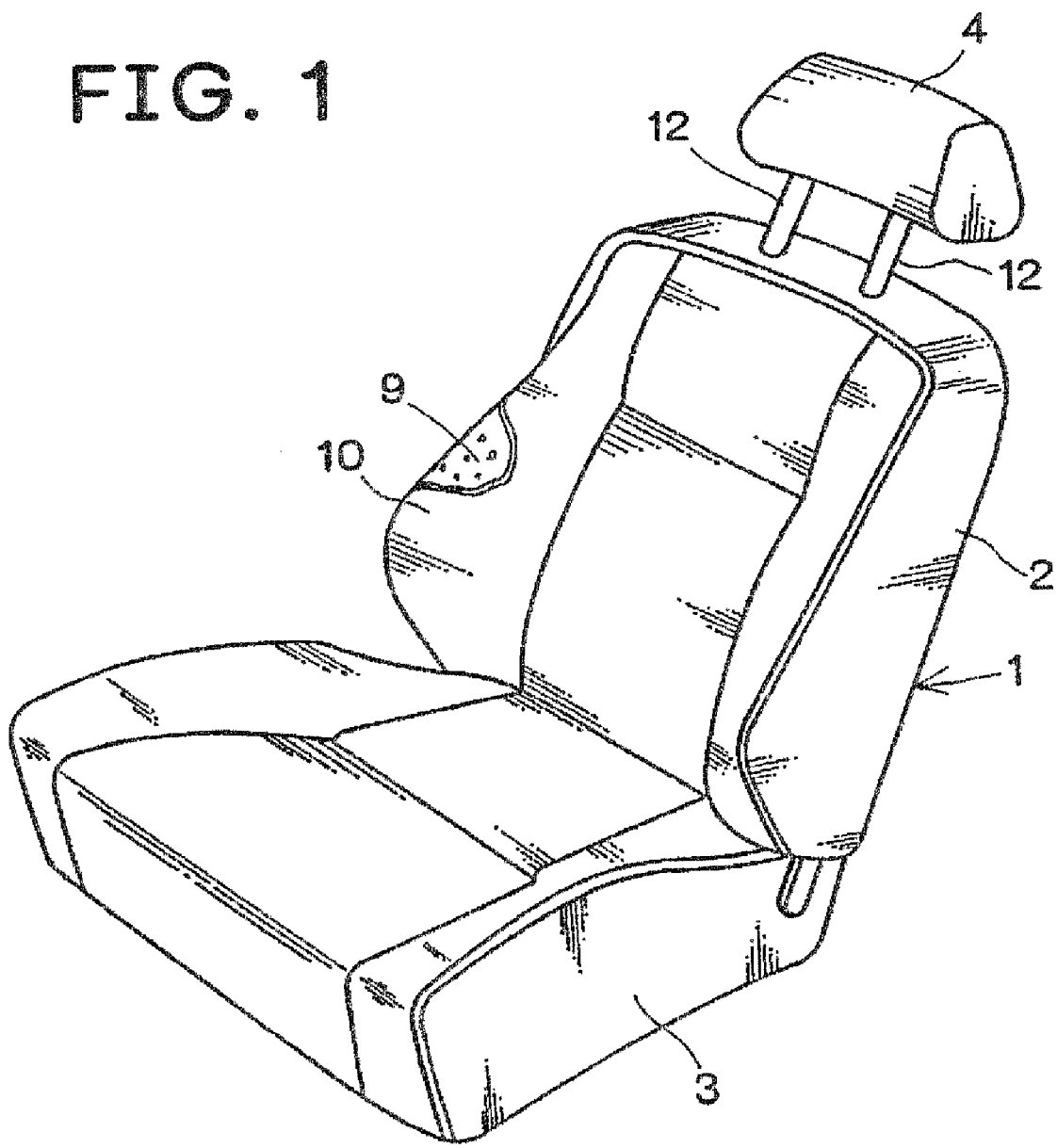
FIG. 1 is a perspective view showing a vehicle seat.

An embodiment of the present invention will be described with reference to the accompanying drawings. A vehicle seat 1 of the invention has a seat back 2, a seat bottom 3 and a headrest 4 provided at the top of the seat back 2. A seat back frame 5 of the seat back 2 has a pair of side frames 6, an upper frame 7 and a lower frame 8, and has a substantial rectangular shape. The seat back frame 5 is attached with a cushion 9, and the front side of the cushion 9 is covered with a skin member 10.

A headrest support 11, which is movable to and from the seat back frame 5 and horizontally extends, is disposed near the upper frame 7. Vertical engagement parts 13, into which lower parts of pillars 12 of the headrest 4 are inserted, are fastened to the headrest support 11. The headrest 4 is vertically adjustable with the aid of the pillars 12 and the vertical engagement parts 13.

L-shaped brackets 19 are fixed to the upper parts of the side frames 6 (or both sides of the upper frame 7). Each bracket 19 is provided with an upper link mechanism 15. Each upper link mechanism 15 has a vertically elongated link 17, a horizontally elongated turn arm 23 and a guide arm 16. The guide arm 16 is rotatably pivoted on the bracket 19 with the aid of a shaft 20, and the turn arm 23 is rotatably pivoted on the bracket 19 with the aid of a shaft 25. The top end of the guide arm 16 is pivoted at the mid point of the vertical link 17 as longitudinally viewed, by means of a pin 18. The top end of the turn arm 23 is pivoted on the lower part of the vertical link 17 by means of a pin 24. The end parts of the headrest support 11 are fixed to the upper parts of the vertical links 17. The other end of the turn arm 23 is pivoted on the upper part of a longitudinally elongated coupling rod 26 by means of a pin 27.

Figure 3:
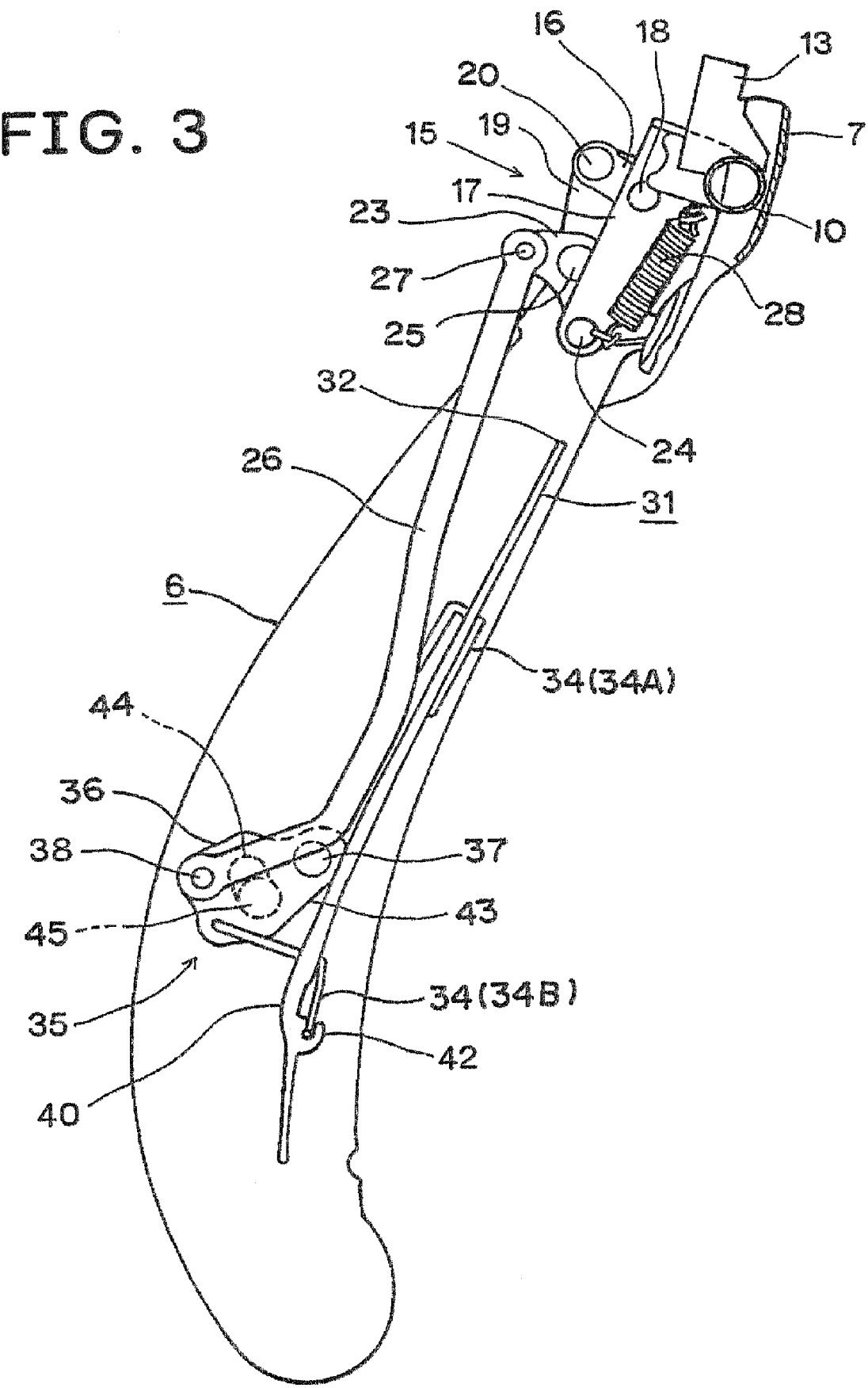
FIG. 3 is a side view showing a side frame of the seat back frame and the basic parts of the active headrest mechanism.
Figure 4:
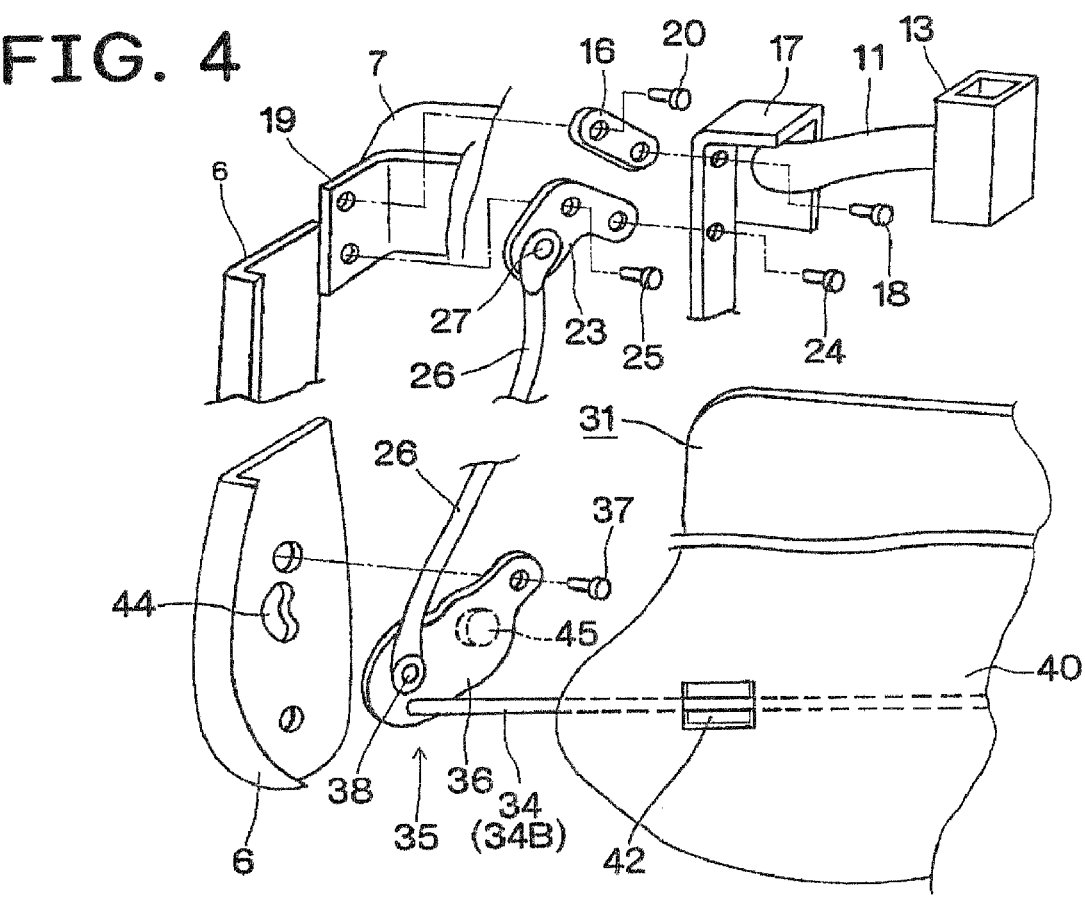
FIG. 4 is a perspective view showing an upper link mechanism and a lower link mechanism of the active headrest mechanism.

As shown in FIG. 3, one end of a return spring 28 is coupled to the lower end of the vertical link 17, and the other end of the return spring 28 is coupled to the side frame 6. The vertical link 17 is normally kept at a lower standby position with the aid of resilience of the return spring 28 or the like. With this, the headrest 4 is also kept at a normal position. When the coupling rod 26 lowers and the turn arm 23 is turned counterclockwise in FIG. 3, the upper part of the vertical link 17 moves to the front upper side and hence, moves the headrest 4 to the front, through the headrest support 11.

A flexible cushion plate 31 is disposed on the inner side of the seat back frame 5. The plate 31 is preferably made of synthetic resin such as polypropylene and takes the form of a single rectangular plate. The plate 31 is mounted on a seat spring 34 such as a zigzag spring or a formed wire spring. The seat spring 34 has at least upper and lower seat springs 34A and 34B, which substantially horizontally extend. The upper seat spring 34 is coupled at both ends to the side frames 6, and both sides of the lower seat spring 34B are coupled to lower link mechanisms 35, which are provided in the side frames 6. The seat cushion 9 is provided on the front side of the plate 31.

In the conventional art, the cushion of the seat back is directly supported by a number of seat springs, without the cushion plate being interposed therebetween. In such a conventional cushion, when a strong load is locally applied to the cushion, the seat spring moves vertically, not to the rearward, and the cushion enters between the adjacent two springs. As a result, there is a chance that the unwanted situation occurs where the seat occupant is locally moved to the rear side.

The cushion plate 31 successfully overcomes the above disadvantage. Upon receiving a normal load from a seat occupant T through the cushion 9, the cushion plate 31 moves rearward within a predetermined range of distance while being properly deformed and resisting the resilience of the seat spring 34. The plate 31 receives the normal load through the cushion 9 in its entirety. In other words, the plate 31 transfers the resilience of the seat spring 34 to the cushion 9 with the "plane" of a large area. The seat occupant T has more favorable seating feeling when compared to the conventional art in which the cushion 9 is supported only by the seat spring 34.

An upper edge 32 of the cushion plate 31 is positioned in a level corresponding to the chest of the average seat occupant T, and a lower part of the cushion plate 31 is located at such a height position as to support the waist of the seat occupant T.

Both ends of the lower seat spring 34B are coupled to turn arms 36 of the lower link mechanisms 35. Each turn arm 36 is pivoted on the side frame 6 by means of a shaft 37. The lower part of the coupling rod 26 is coupled to the turn arm 36 by means of a pin 38.

Figure 5:
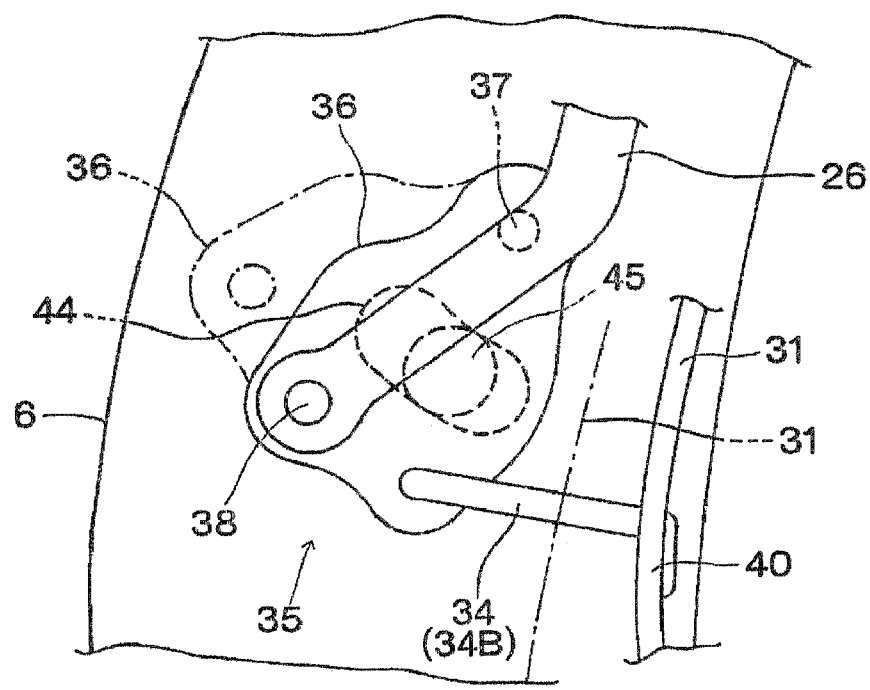
FIG. 5 is a side vies showing the lower link mechanism.
Figure 6:
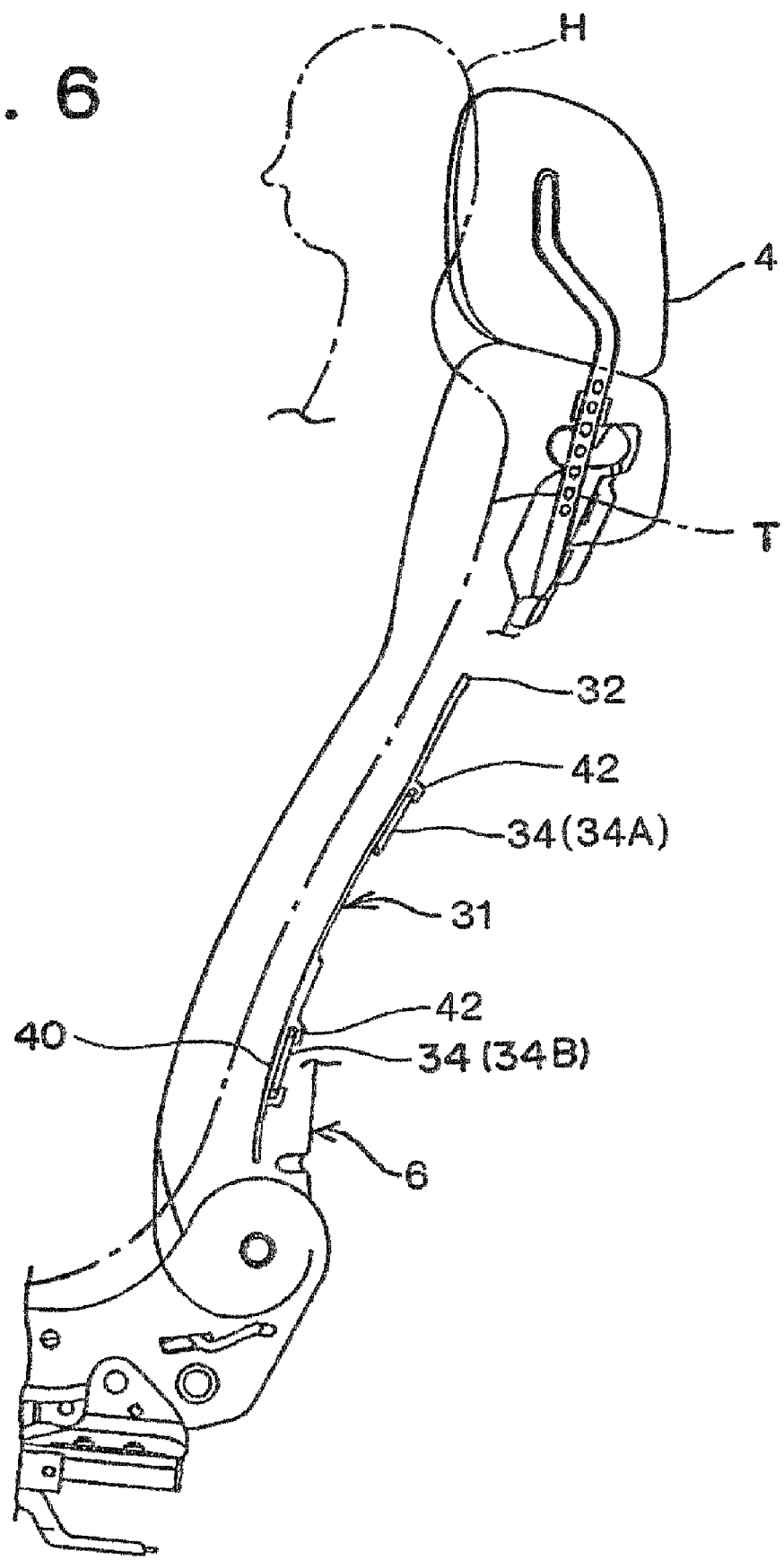
FIG. 6 is a side view showing a relationship between a skeleton of a seat occupant and a cushion plate.

When the rear-end collision forwardly moves the vehicle seat 1 relative to the seat occupant T, a collision load exceeding the normal load is applied to the cushion plate 31, so that the plate 31 greatly moves rearward beyond the predetermined range of distance. This movement rotates the turn arm 36 with the aid of the lower seat spring 34B counterclockwise from a position indicated by a dotted line to a position indicated by a solid line in FIG. 5, thereby to lower the coupling rod 26. In turn, the turn arm 23 of the upper link mechanism 15 rotates counterclockwise in FIG. 3, the upper part of the vertical link 17 moves upward while resisting the resilience of the return spring 28, and hence, moves the headrest 4 to the front with the aid of the headrest support 11. Therefore, when the rear-end collision occurs, the headrest 4 protects the head (neck) of the seat occupant T to lessen the damage to the seat occupant T.

In the invention, when the rear-end collision occurs, the cushion plate 31 receives substantially the whole back of the seat occupant T. As a result, the local, unwanted rearward movement of the back of the seat occupant is efficiently prevented and the back of the seat occupant T is kept in a stably-seated position even at the time of the rear-end collision.

With regard to the rearward movement quantity of the cushion plate 31, which is caused by the collision load, a waist support portion 40 for supporting a portion including the waist of the seat occupant T has the largest movement quantity. For this reason, it is preferable to attach the lower seat spring 34B to the waist support portion 40. The lower seat spring 34B attached to the waist support portion 40 detects the rearward movement of the seat occupant T and efficiently and reliably moves the headrest 4 forwardly.

The rearward movement quantity of the upper seat spring 34A, which is located apart from the waist support portion 40, when it receives a collision load, is smaller than that of the lower seat spring 34B. For this reason, it is not preferable to couple the upper seat spring 34A to the lower link mechanism 35. When the upper seat spring 34A moves rearward to a position where it can detect the rear-end collision, the lower seat spring 34B moves to a position that is located more rearward than the position of the upper seat spring. If so set, the waist of the seat occupant T moves excessively rearward and it is difficult for the seat occupant T to keep his/her back in a preferable position. Accordingly, also in terms of securing the preferable position of the back of the seat occupant T at the time of the rear-end collision, it is preferable to couple the lower seat spring 34B attached to the waist support portion 40 to the lower link mechanism 35. When the lower seat spring 34B is attached to the lower link mechanism 35, it will be ensured to reliably operate the active headrest mechanism and to keep the posture of the seat occupant T.

Figure 2:
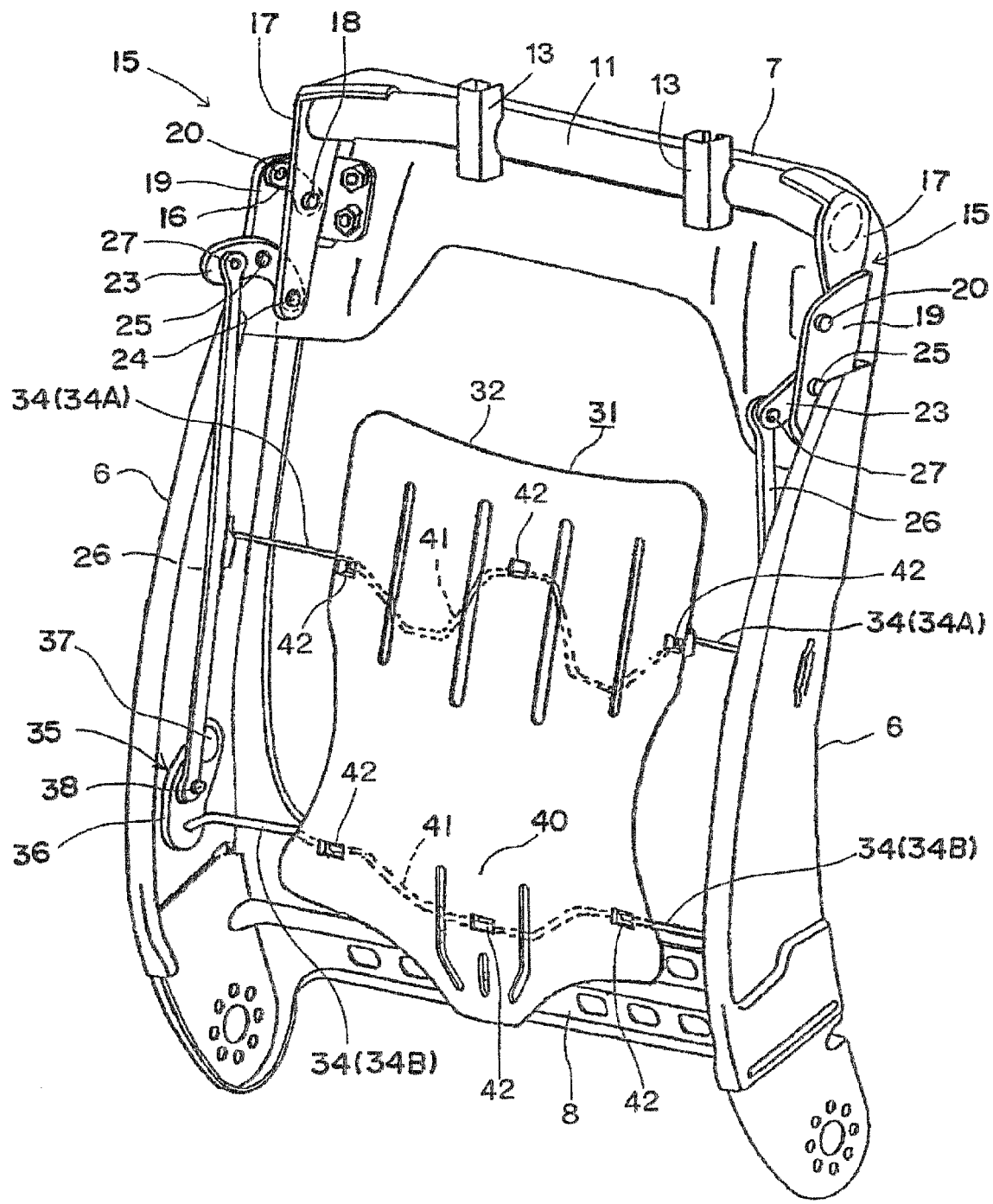
FIG. 2 is an exploded perspective view showing a seat back frame and basic parts of an active headrest mechanism of the vehicle seat.

Both sides of the seat spring 34 are shaped to be simply linear. A central zigzag portion 41 of the seat spring 34 is bent in such a direction in which the central zigzag portion does not deviate from the cushion plate 31, as clearly shown in FIGS. 2 and 3. The zigzag portion 41 supports the cushion plate 31 on the "plane" to thereby provide a stable rearward movement of the cushion plate 31. The zigzag portion 41 engages with a plurality of hooks 42 of the cushion plate 31 to thereby prevent the cushion plate 31 from positionally shifting from the seat spring 34.

A rotation quantity of the turn arm 36 of the lower link mechanism 35 is defined by engagement a guide slot 44 formed in the side frame 6 (or turn arm 36) with a slide pin 45 attached to the turn arm 36 (or side frame 6).

Operation of Embodiment

Upon receiving the normal load from the seat occupant T, the cushion plate 31 moves rearward within the predetermined range of distance while being properly deformed and resisting the resilience of the seat spring 34. The plate 31 receives the normal load through the cushion 9 in its entirety, and the normal load is dispersed into the whole plate 31. Therefore, the back of the seat occupant T is kept in a good position.

When the vehicle seat 1 is moved forward relative to the seat occupant T by the rear-end collision, a collision load in excess of the normal load is applied to the cushion plate 31, so that the plate 31 greatly moves rearward beyond the predetermined range of distance. This movement rotates the turn arm 36 with the aid of the lower seat spring 34B counterclockwise from a position indicated by a dotted line to a position indicated by a solid line in FIG. 5, thereby to lower the coupling rod 26. In turn, the turn arms 23 of the upper link mechanism 15 rotates counterclockwise in FIG. 3, the upper part of the vertical link 17 moves to the front upper side, and hence, moves the headrest 4 to the front with the aid of the headrest support 11. Therefore, when the rear-end collision occurs, the headrest 4 protects the head (neck) of the seat occupant T to lessen the damage to the seat occupant T.

Thus, the lower seat spring 34B supporting the cushion plate 31 directly transmits the rearward movement of the cushion plate 31, which is caused by the collision load, to the lower link mechanism 35. This efficiently effects both the collision load detection and the collision load transmission. In the invention, the collision load can be detected by the cushion plate 31 and the seat spring 34, which give comfort to the seat occupant T. Therefore, the collision load can be detected without impairing the comfort of the vehicle seat.

The upper edge 32 of the cushion plate 31 is positioned in a level corresponding to the chest of the average seat occupant T, so that even when the rear-end collision occurs, the movement of the chest of the seat occupant T to relatively rearward positions is minimized. Therefore, even when a head H of the seat occupant T is forcibly moved forward by the reaction to the collision load, the positional shift of the head H from the chest is more reduced than in the conventional art, thereby lessening the damage to the seat occupant T.

The invention claimed is:

1. An active headrest mechanism for a vehicle seat comprising:
    a seat back frame having a first side frame and a second side frame;
    a first seat spring and a second seat spring disposed between the first and second side frames;
    a single plate-shaped flexible cushion plate attached to the seat springs;
    a seat cushion provided on the front side of the cushion plate, for receiving resilience of the seat springs through the cushion plate;
    a first link mechanism and a second link mechanism respectively provided near the first and second side frames; and
    a headrest coupled to the first and second link mechanisms, wherein the first seat spring connects to both the first and second link mechanisms, whereby when the first seat spring is moved rearward by a collision load acting on the seat cushion, the headrest is moved forward, and
    wherein the second seat spring connects to both the first and second side frames.

2. The active headrest mechanism for a vehicle seat according to claim 1, wherein a central part of the seat spring coupled to the link mechanism is mounted to a portion including a waist support portion of the cushion plate.

3. The active headrest mechanism for a vehicle seat according to claim 1, wherein the link mechanism includes a return spring for returning the headrest to a normal position located on the back side thereof.

4. The active headrest mechanism for a vehicle seat according to claim 1, wherein an upper edge of the cushion plate is positioned in a level corresponding to a chest of an average seat occupant.

5. The active headrest mechanism for a vehicle seat according to claim 1, wherein the link mechanism includes an upper link mechanism to which the headrest is coupled, a lower link mechanism to which the seat spring is coupled, and a longitudinally elongated coupling rod for coupling the lower link mechanism and the upper link mechanism.

* * * * *